March 18, 1958 W. KLATT 2,826,957
PHOTOGRAPHIC ENLARGING APPARATUS
Filed July 6, 1955 3 Sheets-Sheet 1
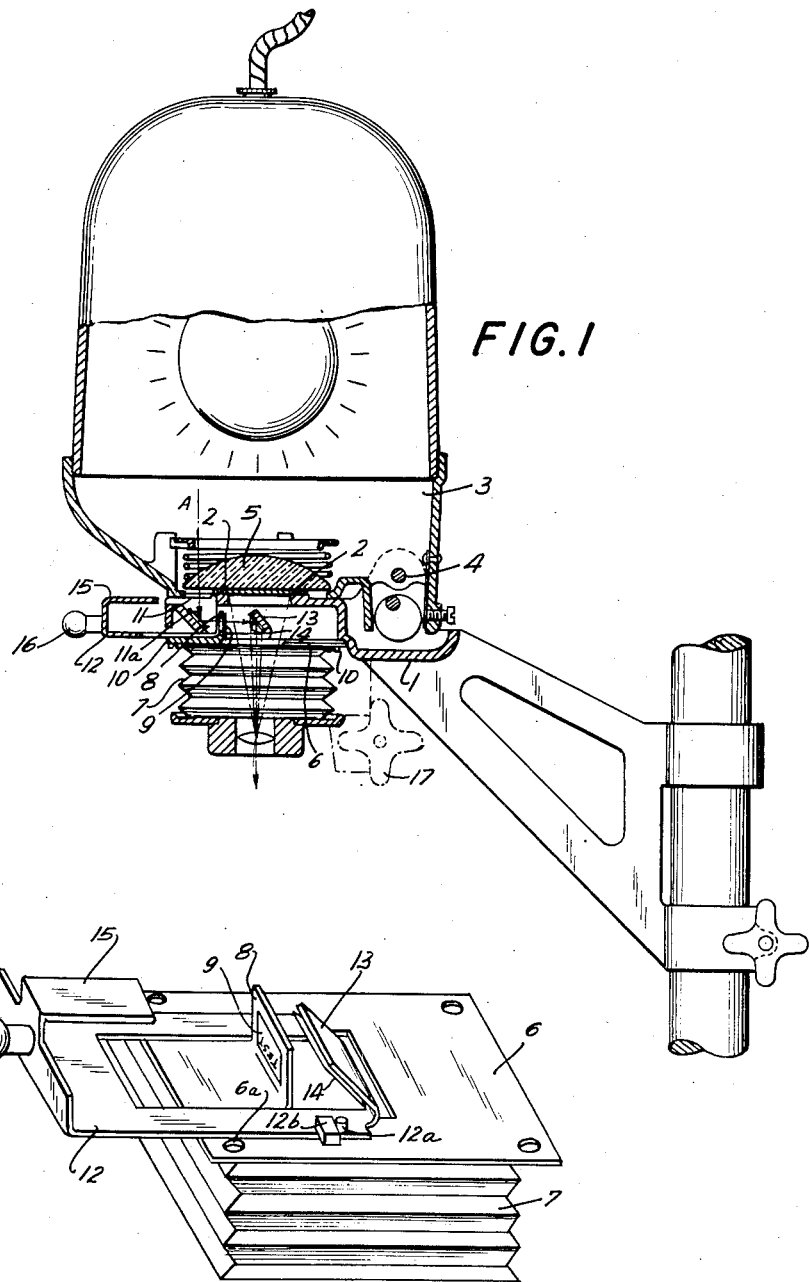

March 18, 1958 W. KLATT 2,826,957
PHOTOGRAPHIC ENLARGING APPARATUS
Filed July 6, 1955 3 Sheets-Sheet 2

INVENTOR.
Walter Klatt
BY
Tidball S. Storker
Attorney

March 18, 1958 W. KLATT 2,826,957
PHOTOGRAPHIC ENLARGING APPARATUS
Filed July 6, 1955 3 Sheets-Sheet 3
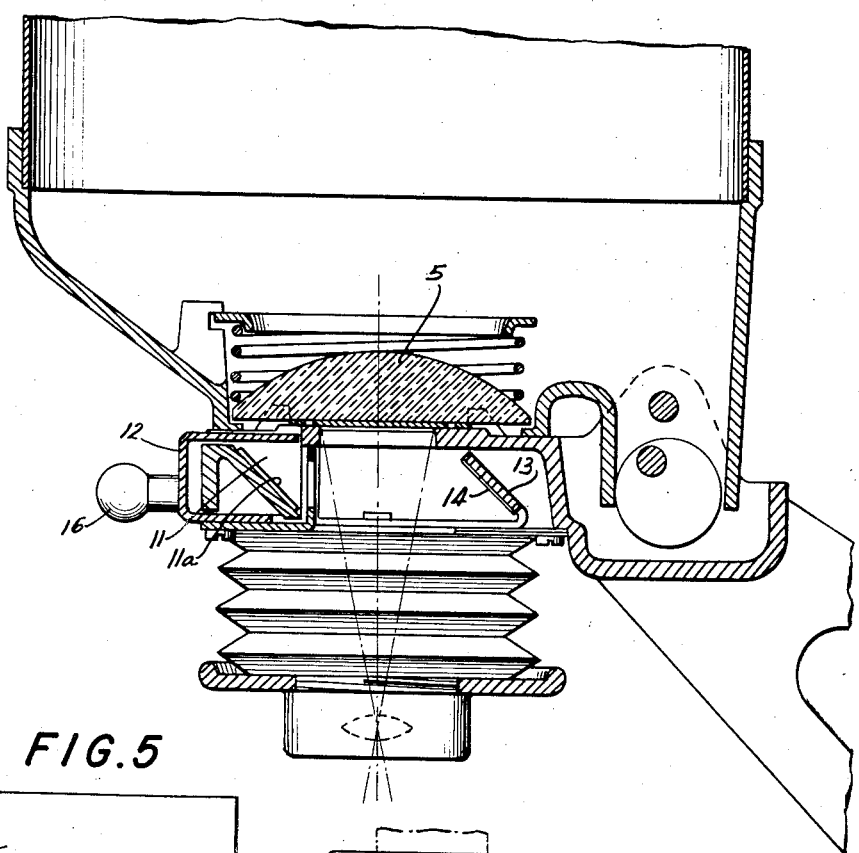
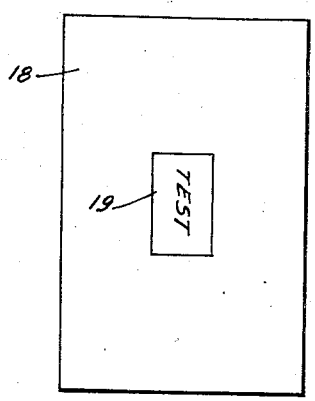
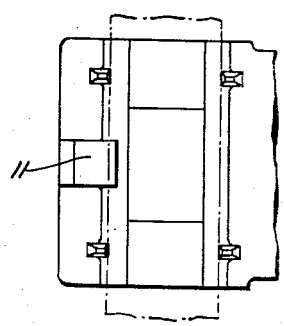
INVENTOR.
Walter Klatt United States Patent Office 2,826,957
Patented Mar. 18, 1958

2,826,957
PHOTOGRAPHIC ENLARGING APPARATUS

Walter Klatt, Stuttgart-Feuerbach, Germany, assignor to Paul Kienzle Apparate- und Modellbau, Stuttgart-Bad Cannstatt, Germany Application July 6, 1955, Serial No. 520,288
Claims priority, application Germany July 2, 1954
7 Claims. (Cl. 88—24)

The present invention relates to the art of photography and more particularly to that part of the photographic art which deals with enlarging.

Enlargers which are not automatic must be focused manually. Such manual focusing of the enlarger requires a great deal of time and is extremely inconvenient because it is necessary to place a test negative in the position of the film to be enlarged, than to focus the enlarger, and then to remove the test negative and replace it with the film to be enlarged, and each time an enlargement is made, all of these steps must be taken. Not only is this conventional manner of operating an enlarger which requires manual focusing extremely inconvenient and time consuming, but in addition the film is easily injured because of the frequency with which it is inserted into and removed from the apparatus.

Although the above problem has been known for some time, all of the solutions to this problem involve very expensive structures such as a shiftable guide for the film and the like, such shiftable guide creating further problems such as the requirement of a special pressure device for holding the film properly while it is being enlarged.

One of the objects of the present invention is to provide an enlarger which is manually focused and which at the same time does not require the film negative and test negative to be exchanged with each other in order to focus the enlarger.

Another object of the present invention is to provide an enlarger of the above type in which both the test negative and film negative may remain stationary during focusing of the enlarger.

It is also an object of the present invention to focus an enlarger manually and without in any way moving either the test negative or the film negative during the focusing or during the subsequent enlarging.

A further object of the present invention is to provide a manually focusable enlarger with a means for focusing the enlarger without moving either the test negative or the film negative and at the same time providing as much light as is required both for focusing as well as for enlarging.

Still another object of the present invention is to provide an enlarger capable of accomplishing all the above objects and at the same time made up of simple and ruggedly constructed parts which are very reliable in operation.

With the above objects in view, the present invention mainly consists of a process for manually focusing the objective of the enlarger with the aid of a test negative, this process including the steps of locating the test negative outside of the plane of the film negative to be enlarged, and simultaneously focusing the objective for the test negative as well as for the film negative.

Also with the above objects in view the present invention mainly consists of an enlarger which includes a film support means forming a passage through which a light beam may pass along the optical axis, this film support means having an upwardly directed face located in a given plane for supporting a negative to be enlarged on this face in this given plane, and this film support means has a downwardly directed face located below its upwardly directed face. A plate is fixed to the film support means on its downwardly directed face and is formed with an opening through which a light beam may pass along the optical axis, and a test negative support means is integral with the plate for supporting a test negative below the above mentioned plane of the film to be enlarged and in a plane normal to the plane of the film to be enlarged.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a fragmentary partly sectional side elevational view of an enlarger according to the present invention;

Fig. 2 shows the structure of Figs. 1 and 1a in the position which they take when the actual enlarging is carried out;

Fig. 3 is a fragmentary perspective view showing the manner in which a reflector of the invention is mounted for movement;

Fig. 4 is a fragmentary top plan view illustrating the support for the film to be enlarged in association with a light guide used in the projection of the test negative; and Fig. 5 illustrates the manner in which the image of the test negative appears in the field of the enlargement.

Figure 1A:
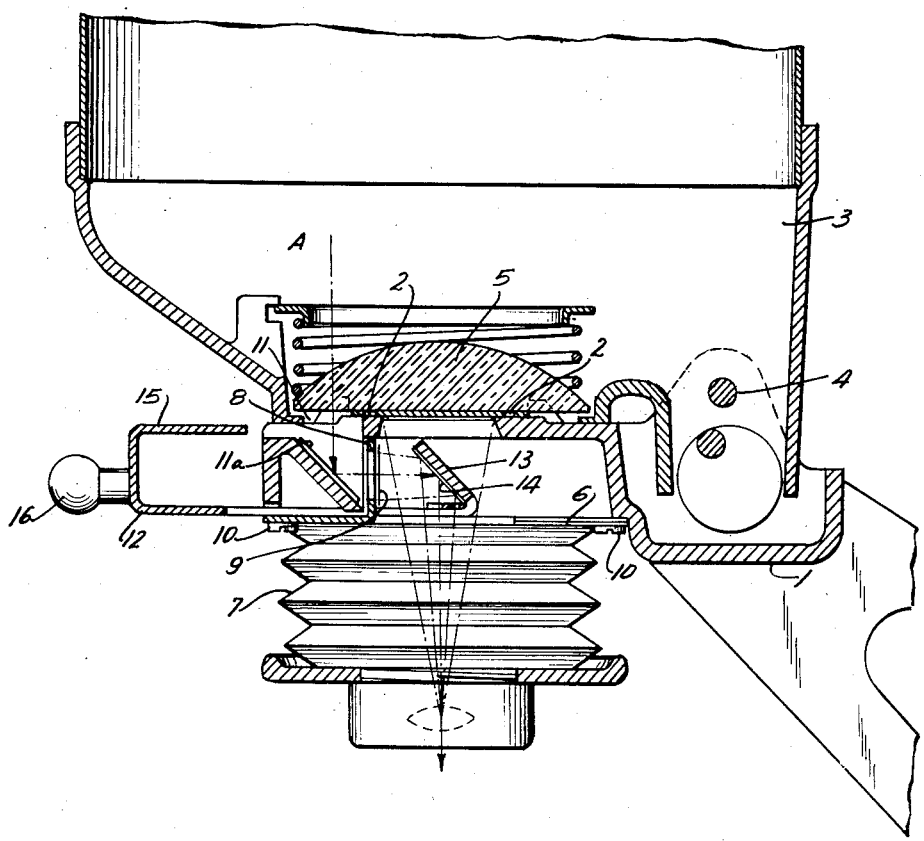
Fig. 1a shows on an enlarged scale that part of Fig. 1 which includes a structure of the invention.

Referring now to the drawings, and to Figs. 1, 1a and 2 in particular, it will be seen that the structure of the invention includes a stationary film support 1 located at the bottom end of the enlarger head and having an upwardly directed face provided with guides 2 which guide the film negative to be enlarged, this upper face of the film support 1 locating the film to be enlarged in a given, predetermined plane. The manner in which the film is guided is clearly evident from Fig. 4. The enlarger head 3 is turnable on a stationary pivot 4 for turning movement with respect to the film support means 1 which forms the bottom end of the enlarger head 3 in the operating position of the latter, shown in the drawings. The enlarger head 3 supports in a known way the lens 5 which is urged downwardly by a spring in the manner shown in the drawings. This lens 5 has a flat bottom face and engages the film in the manner indicated in Figs. 1, 1a and 2 in order to press the film so that it is flat during the enlarging.

The film support means 1 is hollow so that it forms a passage through which the light beam may pass along the optical axis, and the film support means 1 has a downwardly directed bottom face to which a plate 6 is connected in order to close the bottom of the film support means 1. This plate 6 is formed with a cutout through which the light may pass along the optical axis, and the plate 6 is furthermore connected in a light tight manner to the bellows 7, in a manner shown in the drawings.

The opening of the plate 6 is formed by an upwardly struck portion 8 thereof, and this portion 8 is itself formed with a cutout (Fig. 3) so that the upwardly struck portion 8 of the plate 6 forms a frame to which a test negative 9 may be fixed as by gluing, for example. Thus, the frame 8 forms a support means for the test negative, and this support means is in a plane normal to the plate 6 as well as normal to the plane of the upper face of the film support means 1 on which the film to be enlarged is located.

The corners of the plate 6 are formed with elongated openings 6a through which screws 10 freely extend, these screws having head ends larger than the openings 6a and threadedly engaging the threaded bores of the film support means 1. Thus, when the screws 10 are loosened, the plate 6 may be shifted in order to adjust the position of the frame 8, and then the plate 6 may be fixed in its adjusted position by tightening the screws 10. The adjustment of the plate 6 is carried out in order to locate the plane in which the test negative 9 is located at the same optical distance from the objective as the plane in which the film negative is located.

The film support means 1 is formed with a light passage 11 at a part thereof which is displaced laterally from the optical axis, this light passage 11 being located beneath an edge portion of the lens 5. At the bottom of the light passage 11 the film support means 1 is provided with a reflecting face 11a which is inclined in a plane located at 45° to the optical axis and which is directed toward the test negative 9. The light from the interior of the enlarger head 3 passes downwardly through the edge portion of the lengths 5, as shown by the arrow A, to the reflecting face 11a, and from the latter through the test negative. In this way the test negative is brightly illuminated. The reflecting face 11a located at the bottom end of the light passage 11 may be obtained either by providing the surface 11a with a bright color or by providing it with a mirror, for example, this surface 11a being as bright and as reflective as possible in order to convey the light through the test negative with as little loss of light as possible.

A reflector means 14 is movably supported on the plate 6 for movement to and from a position where this reflector means is located along the optical axis for projecting the image of the test negative along the optical axis. This reflector means 14 may be in the form of a mirror carried by an end portion 13 of a carrier 12 which may be in the form of a sheet metal plate slidable on the plate 6 (Fig. 3). As is evident from the drawings the carrier 12 is formed with an elongated cutout through which the frame 8 extends, and furthermore the part of film support means 1 which is provided with the reflecting face 11a extends through this cutout of the carrier 12. The end of the carrier 12 opposite from the end portion 13 thereof which carries the reflector 14 is substantially U-shaped and is provided with an upper leg 15 which is adapted to extend through an opening formed between the bottom surface of the enlarger head 3 and the top surface of the film support means 1 at a part thereof just to the left of the reflecting surface 11a, as indicated in Fig. 2. Furthermore, the carrier 12 is provided with a handle 16 so that the operator may shift the carrier 12 between the positions shown in Fig. 2 and that shown in Figs. 1 and 1a. In the position of the part shown in Figs. 1 and 1a the end portion 13 of carrier 12, which is parallel to the reflecting surface 11a, locates the reflector 14 in a position where it projects the image of the test negative 9 to form a bright image 19 located within the field 18 of the enlargement, as shown in Fig. 5. When the carrier 12 is shifted to the position of Fig. 2, the reflector means 14 is located completely out of the passage for the light beam along the optical axis, and furthermore, the leg 15 of carrier 12 extends across the light passage 11 to prevent light from reaching the reflecting surface 11a and in this way allow the total light to be used for the enlargement.

In order to accurately locate the reflector 14 in the position shown in Figs. 1 and 1a, the carrier 12 is provided with a stop pin 12a shown in Fig. 3. The carrier 12 is guided for movement on the plate 6 by the guide members 12b, one of which is indicated in Fig. 3, and when the stop pin 12a engages the guide member 12b shown in Fig. 3 the reflector means 14 is properly positioned for projecting the image of the test negative. As is shown in Fig. 5 the projected image of the test negative forms a bright area within the field of the enlargement, and focusing of this image simultaneously focuses the enlarger for the subsequent enlargement. The distance from the objective to the reflector 14 when the latter is in the position of Figs. 1 and 1a plus the distance from the reflector 14 to the test negative in the position of the part shown in Figs. 1 and 1a is equal to the distance from the objective to the film negative to be enlarged, and in this way focusing of the image of the test negative simultaneously focuses the enlarger for the film negative.

With the above described features of the invention the focusing of an enlarger which does not have an automatic focusing device is extremely simple and saves a considerable amount of time as compared to the above discussed conventional process. Thus, with the invention the amount of work required for carrying out an enlargement is greatly reduced and accelerated. Furthermore, the film to be enlarged is protected to a far greater extent with the process and apparatus of the present invention because it is not rapidly inserted into and removed from the film guide. In spite of this fact the greatest precision in focusing may be obtained for the enlargement.

It will be understood that each of the elements described above, or two or more together, may also find a useful application in other types of enlarging process and apparatus differing from the types described above.

While the invention has been illustrated and described as embodied in an enlarging process and apparatus for an enlarger requiring manual focusing, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an enlarger, in combination, film support means forming a passage through which a light beam may pass along the optical axis, said film support means having an upwardly directed face located in a given plane for supporting a negative to be enlarged on said face in said plane, and said film support means having a downwardly directed face located below said upwardly directed face; a plate fixed to said film support means at said downwardly directed face thereof and formed with an opening through which said light beam may pass along the optical axis; test negative support means integral with said plate for supporting a test negative below said given plane and in a plane normal to said given plane; and light passage means forming a part of said film support means for directing light along a path laterally displaced from said passage through which said light beam may pass along the optical axis, said light passage means having a reflecting surface located in the plane inclined at 45° to the optical axis and directed toward said test negative support means for directing light from said path through a test negative carried by said test negative support means.

2. In an enlarger, in combination, film support means forming a passage through which a light beam may pass along the optical axis, said film support means having an upwardly directed face located in a given plane for supporting a negative to be enlarged on said face in said plane, and said film support means having a downwardly directed face located below said upwardly directed face; a plate fixed to said film support means at said downwardly directed face thereof and formed with an opening through which said light beam may pass along the optical axis; test negative support means integral with said plate for supporting a test negative below said given plane and in a plane normal to said given plane; and light passage means forming part of said film support means for directing light along a path laterally displaced from said upwardly directed face of said film support means and from said passage through which said light beam may pass along the optical axis, said light passage means having a reflecting surface located in the plane inclined at 45° to the optical axis and directed toward said test negative support means for directing light from said path through a test negative carried by said test negative support means.

3. In an enlarger, in combination, film support means forming a passage through which a light beam may pass along the optical axis, said film support means having an upwardly directed face located in a given plane for supporting a negative to be enlarged on said face in said plane, and said film support means having a downwardly directed face located below said upwardly directed face; a plate fixed to said film support means at said downwardly directed face thereof and formed with an opening through which said light beam may pass along the optical axis; test negative support means integral with said plate for supporting a test negative below said given plane and in a plane normal to said given plane; light passage means forming a part of said film support means for directing light along a path laterally displaced from said passage through which said light beam may pass along the optical axis, said light passage means having a reflecting surface located in the plane inclined at 45° to the optical axis and directed toward said test negative support means for directing light from said path through a test negative carried by said test negative support means; and reflector means located along the optical axis for directing the image of the test negative along the optical axis.

4. In an enlarger, in combination, film support means forming a passage through which a light beam may pass along the optical axis, said film support means having an upwardly directed face located in a given plane for supporting a negative to be enlarged on said face in said plane, and said film support means having a downwardly directed face located below said upwardly directed face; a plate fixed to said film support means at said downwardly directed face thereof and formed with an opening through which said light beam may pass along the optical axis; test negative support means integral with said plate for supporting a test negative below said given plane and in a plane normal to said given plane; light passage means forming a part of said film support means for directing light along a path laterally displaced from said passage through which said light beam may pass along the optical axis, said light passage means having a reflecting surface located in the plane inclined at 45° to the optical axis and directed toward said test negative support means for directing light from said path through a test negative carried by said test negative support means; reflector means located along the optical axis for directing the image of the test negative along the optical axis; and means supporting said reflector means for movement to and from its position located along the optical axis.

5. In an enlarger, in combination, film support means forming a passage through which a light beam may pass along the optical axis, said film support means having an upwardly directed face located in a given plane for supporting a negative to be enlarged on said face in said plane, and said film support means having a downwardly directed face located below said upwardly directed face; a plate fixed to said film support means at said downwardly directed face thereof and formed with an opening through which said light beam may pass along the optical axis; test negative support means integral with said plate for supporting a test negative below said given plane and in a plane normal to said given plane; light passage means forming a part of said film support means for directing light along a path laterally displaced from said passage through which said light beam may pass along the optical axis, said light passage means having a reflecting surface located in the plane inclined at 45° to the optical axis and directed toward said test negative support means for directing light from said path through a test negative carried by said test negative support means; reflector means located along the optical axis for directing the image of the test negative along the optical axis; and a carrier supporting said reflector means in a plane parallel to said bottom reflecting surface of said light passage means, said carrier being movably supported by said plate for shifting movement to and from a position where said carrier locates said reflector means along the optical axis.

6. In an enlarger, in combination, film support means forming a passage through which a light beam may pass along the optical axis, said film support means having an upwardly directed face located in a given plane for supporting a negative to be enlarged on said face in said plane, and said film support means having a downwardly directed face located below said upwardly directed face; a plate fixed to said film support means at said downwardly directed face thereof and formed with an opening through which said light beam may pass along the optical axis; test negative support means integral with said plate for supporting a test negative below said given plane and in a plane normal to said given plane; light passage means forming a part of said film support means for directing light along a path laterally displaced from said passage through which said light beam may pass along the optical axis, said light passage means having a reflecting surface located in the plane inclined at 45° to the optical axis and directed toward said test negative support means for directing light from said path through a test negative carried by said test negative support means; reflector means located along the optical axis for directing the image of the test negative along the optical axis; and a carrier supporting said reflector means in a plane parallel to said reflecting surface of said light passage means, said carrier being movably supported by said plate for movement between a first position where said carrier locates said reflector means along the optical axis and a second position where said carrier locates said reflector means away from the optical axis, said carrier having a portion located over and covering said reflecting surface of said light passage means when said carrier is in its second position and uncovering said reflecting surface in said first position of said carrier.

7. In an enlarger, in combination, film support means forming a passage through which a light beam may pass along the optical axis, said film support means having an upwardly directed face located in a given plane for supporting a negative to be enlarged on said face in said plane, and said film support means having a downwardly directed face located below said upwardly directed face; a plate fixed to said film support means at said downwardly directed face thereof and formed with an opening through which said light beam may pass along the optical axis; test negative support means integral with said plate for supporting a test negative below said given plane and in a plane normal to said given plane; light passage means forming a part of said film support means for directing light along a path laterally displaced from said passage through which said light beam may pass along the optical axis, said light passage means having a reflecting surface located in the plane inclined at 45° to the optical axis and directed toward said test negative support means for directing light from said path through a test negative carried by said test negative support menas; reflector means located along the optical axis for directing the image of the test negative along the optical axis; means supporting said reflector means for movement to and from its position located along the optical axis; and stop means engaging one of the two last-mentioned means for stopping said reflector means in its position located along the optical axis.

References Cited in the file of this patent

UNITED STATES PATENTS

| | | |
|---|---|---|
| 1,477,999 | Douglass | Dec. 18, 1923 |
| 1,504,328 | Douglass | Aug. 12, 1924 |
| 2,095,815 | Hopkins | Oct. 12, 1937 |
| 2,286,471 | Dahl | June 16, 1942 |